Patented Jan. 19, 1932

1,841,442

UNITED STATES PATENT OFFICE

RICHARD HERZ AND NORBERT STEIGER, OF FRANKFORT-ON-THE-MAIN, GERMANY, ASSIGNORS TO GENERAL ANILINE WORKS, INC., OF NEW YORK, N. Y., A CORPORATION OF DELAWARE

MORDANT DYESTUFFS OF THE THIAZINE SERIES

No Drawing. Application filed October 2, 1929, Serial No. 396,930, and in Germany October 10, 1928.

Our present invention relates to new mordant dyestuffs, more particularly it relates to valuable mordant dyestuffs which are obtainable by treating hydroxy-sulfoarylimino-naphthoquinones of the general formula:

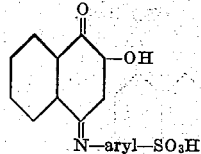

wherein the naphthalene and the aryl nucleus may contain further substituents, with sulfurizing agents. The dyestuffs thus produced probably correspond to the general formula:

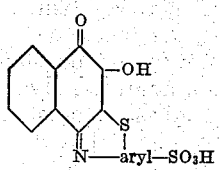

wherein the naphthalene and the aryl nucleus may contain further substituents. The hydroxy-sulfoarylimino-naphthoquinones used as starting materials in our process may be prepared by condensing 1.2-naphthoquinone or its substitution products, as sulfonic acids, with amino-aryl-sulfonic acids.

Dyestuffs of this kind are already described in our U. S. Patent No. 1,497,720. But according to the process of the said patent, by which the sulfonic groups are introduced simultaneously with the formation of the thiazine ring, mixtures of several isomeric sulfonic acids are obtained in which isomers the position of the sulfonic groups is not known. In contradistinction thereof our present process allows to produce uniform dyestuffs with known positions of the sulfonic groups. In consequence of this uniformity the dyestuffs possess especially good dyeing properties. As a great number of amino-aryl-sulfonic acids can be easily obtained, numerous dyestuffs may be produced according to our process in a simple way and in a great purity. Of a special value are those derived from meta-amino-aryl-sulfonic acids.

As to their tinctorial behaviour the dyestuffs obtained by our process are acid mordant dyestuffs. They are soluble in water and in dilute acids, especially in acetic acid. The acid solution exhibits a reddish violet tint turning to blue on the addition of an alkali. The dyestuffs dye the animal fiber from the acid bath and yield when afterchromed bright green shades. They may also be employed for printing wool or cotton according to the chrome-printing processes.

In order to further illustrate our invention the following examples are given, the parts being by weight and all temperatures in centigrade degrees, but we wish it to be understood that we are not limited to the particular products nor reaction conditions mentioned therein.

Example 1

17 parts of 2-hydroxy-4-(4'-methyl-2'-sulfo-phenylimino)1-4-naphthoquinone (obtainable for instance by condensing 1.2-naphthoquinone-4-sulfonic acid with 1-amino-4-methyl-benzene-2-2 sulfonic acid) are introduced at 20–30° into a solution of 12 parts of sulfur in 250 parts of fuming sulfuric acid of 28% strength. The mass is slowly heated to 40°, stirred at this temperature for about 4 hours and then poured into ice. The precipitated dyestuff is filtered off and washed with common salt solution. It corresponds probably to the formula:

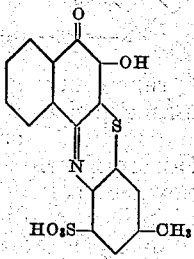

the free acid of this dyestuff is a reddish violet powder, soluble in a dilute caustic soda solution to a blue solution which becomes bright reddish violet when acidified. It dyes wool from an acid bath reddish violet shades turning to bright green when afterchromed.

*Example 2*

40 parts of 2-hydroxy-4-(3' sulfophenylimino)-1.4-naphthoquinone are introduced at 20-30° into a solution of 8 parts of sulfur in 400 parts of fuming sulfuric acid of 30% strength. The mass is treated as described in Example 1. The dyestuff thus produced corresponds probably to the formula:

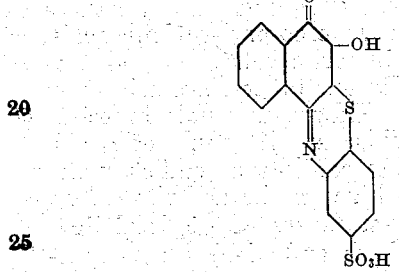

The free acid represents a violet powder very easily soluble in water with a bright claret-red tint. It is scarcely susceptible to lime and yields when afterchromed on the animal fiber bright bluish green shades of an excellent fastness.

A product dyeing clear yellowish green shades is obtained by replacing in the above process metanilic acid by 1.3-dimethyl-4-amino-benzene-6-sulfonic acid.

Similar dyestuffs are produced by treating with sulfurizing agents the condensation products prepared for instance from 1.2-naphthoquinone, 1.2-naphthoquinone-4-sulfonic acid or 1.2-naphthoquinone-4.6-disulfonic acid on the one hand and 1-methyl-4-aminobenzene-6-sulfonic acid or an aminonaphthalene sulfonic acid on the other hand.

We claim:

1. As new products the mordant dyestuffs of the probable general formula:

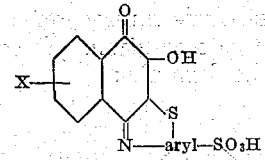

wherein "aryl" represents a naphthalene nucleus, or a benzene nucleus which may contain methyl groups, and X means hydrogen or a sulfonic acid group; which products are violet colored powders, soluble in water and acidified water with a reddish violet tint which turns to blue on the addition of an alkali, dyeing wool from an acid bath reddish violet shades becoming greenish when afterchromed.

2. As new products the mordant dyestuffs of the probable general formula:

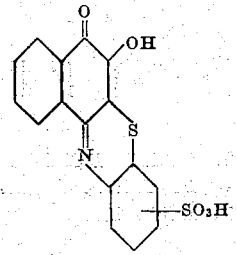

wherein the benzene nucleus may contain methyl groups which compounds are violet colored powders, soluble in water and acidified water with a reddish violet tint which turns to blue on the addition of an alkali, dyeing wool from an acid bath reddish violet shades becoming greenish when afterchromed.

3. As a new product the mordant dyestuff of the probable formula:

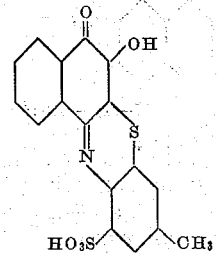

which product is a reddish violet powder, soluble in a dilute caustic soda solution with a blue coloration which becomes bright reddish violet when acidified, dyeing wool from an acid bath reddish violet shades turning to bright green when afterchromed.

4. As a new product the mordant dyestuff of the probable formula:

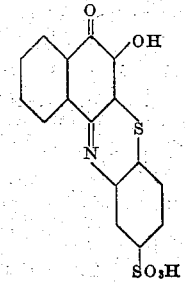

which product is a violet powder, very easily soluble in water with a bright claret-red tint which turns to blue of the addition of an alkali, dyeing wool from an acid bath claret-red shades becoming bluish green when afterchromed.

In testimony whereof, we affix our signatures.

RICHARD HERZ.
NORBERT STEIGER.